United States Patent
Cao et al.

(10) Patent No.: US 11,686,861 B2
(45) Date of Patent: Jun. 27, 2023

(54) SYSTEMS AND METHODS FOR GNSS AMBIGUITY RESOLUTION

(71) Applicant: Honeywell International Inc., Charlotte, NC (US)

(72) Inventors: Xiao Cao, Shanghai (CN); Brian Schipper, Maple Grove, MN (US); Thomas Jakel, Forrest Lake, MN (US); Yanling Min, Shanghai (CN)

(73) Assignee: Honeywell International Inc., Charlotte, NC (US)

( * ) Notice: Subject to any disclaimer, the term of this patent is extended or adjusted under 35 U.S.C. 154(b) by 21 days.

(21) Appl. No.: 17/356,814

(22) Filed: Jun. 24, 2021

(65) Prior Publication Data

US 2022/0268944 A1 Aug. 25, 2022

(30) Foreign Application Priority Data

Feb. 24, 2021 (CN) .......................... 202110204660.1

(51) Int. Cl.
| | |
|---|---|
| *G01S 19/44* | (2010.01) |
| *G01S 19/28* | (2010.01) |
| *G01S 19/25* | (2010.01) |

(52) U.S. Cl.
CPC .............. *G01S 19/44* (2013.01); *G01S 19/28* (2013.01); *G01S 19/258* (2013.01)

(58) Field of Classification Search
CPC ........... G01S 19/44; G01S 19/43; G01S 19/55
See application file for complete search history.

(56) References Cited

U.S. PATENT DOCUMENTS

| | | | | |
|---|---|---|---|---|
| 5,935,194 A | * | 8/1999 | Talbot | G01S 19/44 |
| | | | | 701/469 |
| 6,127,968 A | * | 10/2000 | Lu | G01S 19/44 |
| | | | | 701/1 |
| 7,961,143 B2 | | 6/2011 | Dai et al. | |
| 2004/0145518 A1 | | 7/2004 | Toda et al. | |
| 2011/0309974 A1 | * | 12/2011 | Williamson | G01S 19/41 |
| | | | | 342/357.24 |
| 2017/0192103 A1 | * | 7/2017 | Kundak | G01S 19/05 |
| 2017/0269224 A1 | * | 9/2017 | Zhang | G01S 19/44 |
| 2018/0180743 A1 | | 6/2018 | Hide et al. | |
| 2019/0377095 A1 | | 12/2019 | Brenner | |

(Continued)

FOREIGN PATENT DOCUMENTS

| | | |
|---|---|---|
| CN | 103576175 B | 1/2016 |
| CN | 105242293 A | 1/2016 |

(Continued)

OTHER PUBLICATIONS

Deng et al ("Reliable Real-Time Triple Frequency Cycle Slip Detection and Recovery with Adaptive Detection Thresholds"). Measurement and Science Technology 30 (2019) 055007. pp. 1-8. (Year: 2019).*

(Continued)

*Primary Examiner* — Gregory C. Issing
(74) *Attorney, Agent, or Firm* — Fogg & Powers LLC (57) ABSTRACT

Systems and methods for GNSS ambiguity resolution are described herein. In some examples, the systems and methods utilize multiple search engines in parallel to validate potential integer candidates for ambiguity resolution using adaptively adjusted residual thresholds.

15 Claims, 6 Drawing Sheets

(56) References Cited

U.S. PATENT DOCUMENTS

| | | | | |
|---|---|---|---|---|
| 2020/0158886 | A1* | 5/2020 | Segal | G01S 5/0054 |
| 2020/0408926 | A1 | 12/2020 | Carcanague et al. | |
| 2021/0286089 | A1* | 9/2021 | Dai | G01S 19/073 |
| 2021/0286090 | A1* | 9/2021 | Kozlov | G01S 19/071 |
| 2021/0364655 | A1* | 11/2021 | Schipper | G01S 19/20 |

FOREIGN PATENT DOCUMENTS

| | | | | |
|---|---|---|---|---|
| CN | 106443729 | A | 2/2017 | |
| CN | 111239787 | A | 6/2020 | |
| CN | 111578935 | A | 8/2020 | |
| EP | 2966477 | A1 * | 1/2016 | G01S 19/073 |

OTHER PUBLICATIONS

European Patent Office, "Extended European Search Report from EP Application No. 22155481.9", from Foreign Counterpart to U.S. Appl. No. 17/356,814, filed Jul. 18, 2022, pp. 1 through 14, Published: EP.

Ueno et al., "A Combined Method for GPS Ambiguity Resolution with Single-Frequency Receivers: Application for Ship Berthing", Navigation: Journal of the Institute of Navigation, vol. 47, No. 2, Sep. 1, 2000, pp. 100 through 111, Published in: US.

Walsh, "Real Time Ambiguity Resolution While on the Move", Proceedings of 5th International Technical Meeting of the Satellite Division of the Institute of Navigation (ION GPS 1992), Sep. 18, 1992, pp. 473 through 481, Published in: US.

* cited by examiner

SYSTEMS AND METHODS FOR GNSS AMBIGUITY RESOLUTION

CROSS-REFERENCE TO RELATED APPLICATIONS

This application claims priority to China Patent Application Serial No. 202110204660.1, filed Feb. 24, 2021, and titled "SYSTEMS AND METHODS FOR DFMC GNSS AMBIGUITY RESOLUTION," which is hereby incorporated herein by reference.

BACKGROUND

In survey and navigation markets, many applications require high-precision vehicle location knowledge in outdoor environments to cm-level and even mm-level accuracy. Global Navigation Satellite System (GNSS) relative positioning techniques can be utilized to achieve the required high-precision position. GNSS provides two kinds of ranging measurements, which include code-based pseudorange and carrier phase range. The dynamic accuracy of carrier phase measurements is typically in the mm-level, but this does not account for the unknown number of integer wavelengths that needs to be estimated. Without knowing the integer cycles of carrier, an accurate range cannot be provided. Integer cycle estimation on the carrier measurement, which is referred to as ambiguity resolution, is the key challenge in carrier phase range relative positioning.

GNSS researchers have proposed many algorithms to perform ambiguity resolution of GNSS carrier phase. The LAMBDA (Least-squares AMBiguity Decorrelation Adjustment) algorithm is the most popular algorithm used. However, the LAMBDA algorithm has some obvious disadvantages. For example, the LAMBDA algorithm cannot provide any assurance or probability of successful ambiguity resolution fix because the LAMBDA algorithm does not check through all potential candidates. The LAMBDA algorithm is also typically executed as one instantaneous search epoch, which is not always successful.

SUMMARY

In an example, a system includes a first Global Navigation Satellite System (GNSS) receiver coupled to a first antenna, and a second GNSS receiver coupled to a second antenna. The system further includes at least one processor coupled to a memory, the first GNSS receiver, and the second GNSS receiver. The at least one processor is configured to load GNSS data from the first GNSS receiver and the second GNSS receiver. The at least one processor is further configured to determine a standalone position of the first GNSS receiver and the second GNSS receiver. The at least one processor is further configured to double difference error estimation on code-based pseudorange and double difference pseudorange position and determine covariance using code-based pseudorange. The at least one processor is further configured to select core satellites and define a search space for ambiguity resolution by a first searching engine in its first epoch. The at least one processor is further configured to determine a first list of candidates for ambiguity resolution using the core satellites and determine a second list of candidates for ambiguity resolution using redundant satellites, wherein redundant satellites other than the core satellites. The at least one processor is further configured to adaptively set residual thresholds based on measurement errors and eliminate candidates from the first list of candidates in response to a respective residual exceeding the adaptively set residual thresholds until a single candidate remains in the first list of candidates. The at least one processor is further configured to determine position information using the single candidate remaining in the first list of candidates.

DRAWINGS

Understanding that the drawings depict only exemplary embodiments and are not therefore to be considered limiting in scope, the exemplary embodiments will be described with additional specificity and detail through the use of the accompanying drawings, in which.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the methods presented in the drawing figures and the specification are not to be construed as limiting the order in which the individual steps may be performed. The following detailed description is, therefore, not to be taken in a limiting sense.

In other previous algorithms, for GPS single constellation, four core satellites are selected that provide the best position-dilution-of-precision (PDOP) out of all visible GPS satellites, the search space of ambiguity resolution is predefined based on engineering experience, and all potential candidates of ambiguity resolution are generated for the core satellites. A single loop is initiated to eliminate wrong candidates until there is only one remaining candidate, which is declared as the true candidate. For the multi-constellation case, if the constellation number is N, N+3 satellites are used to form the core satellite list.

Typically, the method to eliminate wrong candidates utilizes redundant satellites to check the measurements' consistency between the core satellite list and a redundant satellite list. A redundant satellite is a visible satellite with qualified measurement, but the redundant satellite is not included in the core satellite list. Each of the candidate sets determined from the core satellites represents a three-dimensional (3D) position, and the 3D positions are fed into measurement equations using the carrier phase measurements from redundant satellites where several residuals are calculated from the measurement equations. The residuals for a particular candidate represents a distance from the candidate (3D position) to the nearest wavefront defined by a redundant satellite's phase measurements. The residuals are then compared with predefined, constant threshold values. If a residual satisfies the predefined, constant threshold, then the candidate is retained in the remaining list. If the residual does not satisfy the predefined, constant threshold, then the candidate is eliminated from the remaining list. The process is repeated until a single candidate remains, which is then regarded as the true ambiguity resolution solution.

Typically, the method to eliminate wrong candidates is a sequential process that epoch by epoch goes through all the candidates in searching space until only one remains. Since the process is sequential, the core satellite list is maintained in the whole searching process epoch by epoch. However, the PDOP can be poor in the first epoch when the core satellite list is selected because the visible satellites are not always sufficient to provide a better PDOP in some epochs. Poor geometry of the core satellites will make ambiguity resolution more difficult and take longer. One potential option to address poor PDOP is to wait for an epoch when there is a better PDOP. However, it cannot be known how many epochs it will take to observe an improved PDOP compared to the first epoch.

The present application addresses this issue using a multi-engine search technique, which enables a new parallel engine to search when a new satellite becomes available that is not in the current core list and can provide better PDOP. If any one of the engines running in parallel finds the true candidate in its searching space, other engines will be terminated automatically. In some examples, if there are ever zero candidates left in a specific engine, that engine will be reset and will look for a new core satellite list that can provide a better PDOP. The maximum number of engines are N, which depends on the performance requirements and available computing resources. By utilizing the multi-engine search technique, the present application can fix the ambiguity resolution in the fewest number of epochs with a specific searching space.

Also, in different scenarios, the quality of GNSS measurements is different due to multiple factors, for example, different receiver/antenna types, the length of baseline between the reference (base) receiver and the mobile receiver(s), the height difference between the reference (base) receiver and mobile receiver(s), the environment of operation (multi-path/shelter), the intensity of local ionosphere delay, and the like. It is not optimal to use, as in previous techniques, a predefined, constant residual thresholds to fit all kinds of scenarios per engineering experience.

To address this issue, the present application includes an effective error estimation method, which can estimate main errors in GNSS measurements based on scenario parameters that are used to define the size of the ambiguity resolution search space and dynamically define the residual thresholds. The techniques described herein provide a more reasonable searching space and adaptive residual thresholds to identify and eliminate wrong candidates. With automatic adaptive threshold setting, the searching space can be narrowed compared to previous techniques, which accelerates the ambiguity resolution search and improves the correct fixing rate compared to previous techniques.

The systems and methods described herein avoid the disadvantage of classic LAMBDA algorithm and improve fixing rate compared to previous techniques. The systems and methods can be applied to single-frequency, single-constellation GNSS and dual-frequency multi-constellation (DFMC) GNSS. The systems and methods described herein can also be widely used in real-time or post-processing high-precise GNSS positioning and GNSS attitude measuring (GPAHRS).

GNSS relative positioning and heading determination is implemented by differencing the carrier-phase measurements of two receivers coupled to respective antennas. In the GNSS relative positioning case, the antenna baseline is dynamic, while in the GNSS heading case, the receivers are both located on a rigid body with a fixed distance between their antennas.

Figure 1:
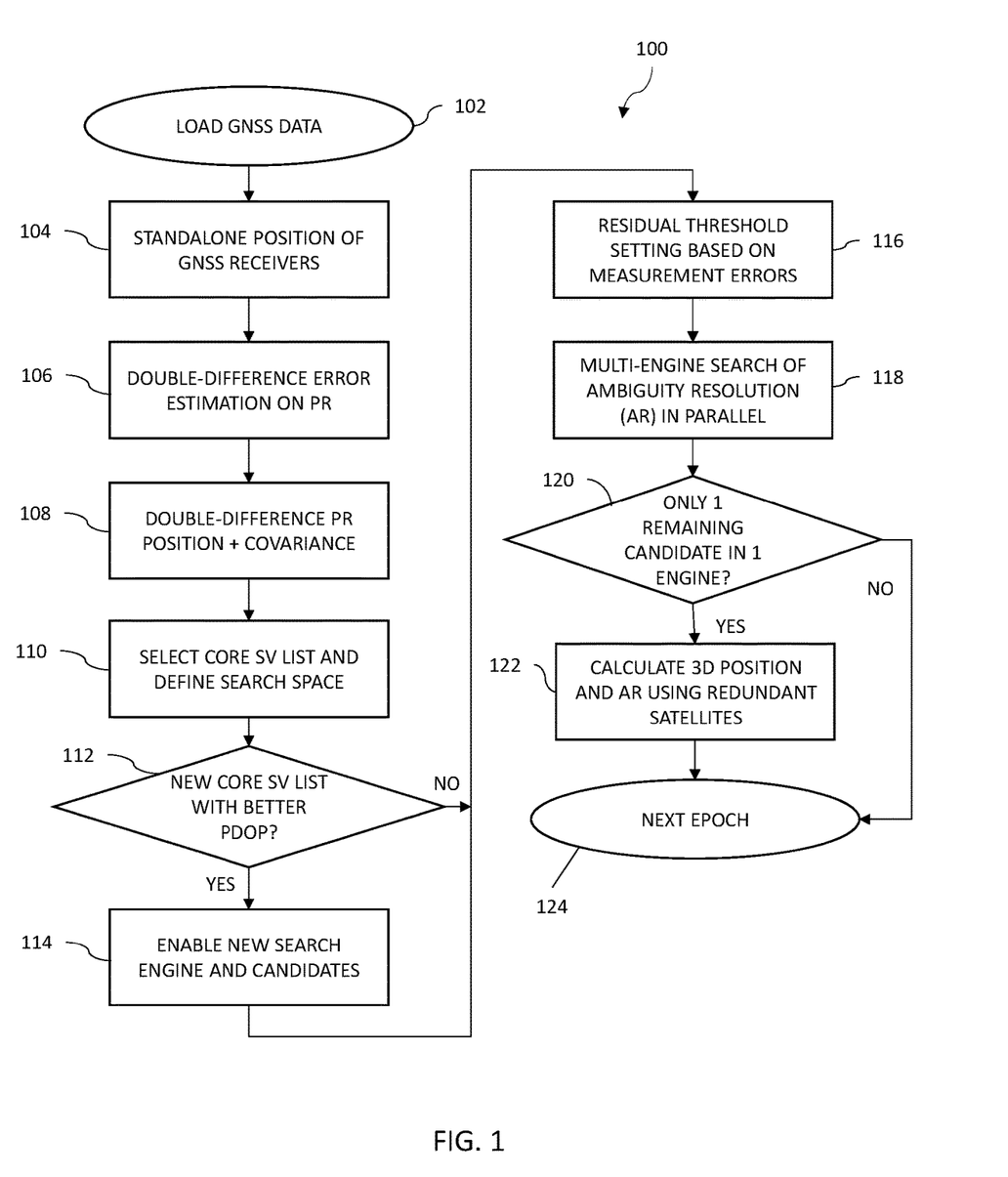
FIG. 1 is a flow diagram of an example method of ambiguity resolution.

FIG. 1 illustrates a flow diagram of an example method 100 for GNSS ambiguity resolution.

The method 100 begins with loading GNSS data from GNSS receivers (block 102). In some examples, at least one GNSS receiver is located in a base station and at least one GNSS receiver is located in a rover station.

The method 100 proceeds with determining the stand-alone position of the first GNSS receiver (for example, in the base station) and the second GNSS receiver (for example, in the rover station) using the GNSS data (block 104).

The method 100 further includes double-differencing the error estimation on the code-based pseudorange (block 106), and double-differencing the code-based pseudorange position and determining the covariance of the code-based difference results (block 108).

The method 100 proceeds with selecting the core satellite list and defining the search space (block 110). In some examples, the core satellite list includes N+3 satellites that provide the best position-dilution-of-precision (PDOP) out of all visible GNSS satellites, where the number of constellations is N. For a single constellation example, the core satellite list includes four core satellites that provide the best PDOP out of all visible GNSS satellites.

Figure 2:
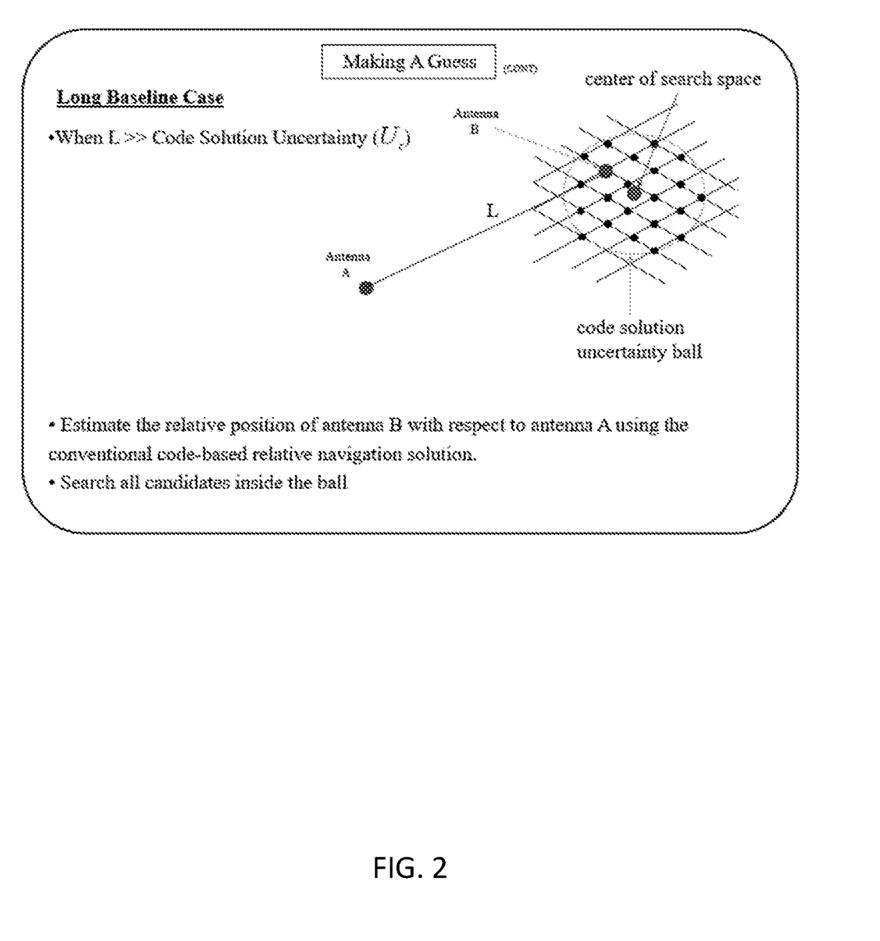
FIG. 2 is a diagram showing searching space definition.

In some examples, the search space of ambiguity resolution is defined based on engineering experience and the concepts discussed with respect to FIG. 2. In general, the ambiguity resolution searching space must be larger than code solution's uncertainty ball shown in FIG. 2. In FIG. 2, the lines of the grid are spaced one wavelength apart. The searching space of ambiguity resolution can be defined as a linear distortion of sigma of dX, multiplied by $(H^TH)^{-1}H^T$:

$$HdX+\lambda N=L => dX=(H^TH)^{-1}H^T(L-\lambda N)$$

Accordingly, in some examples, the searching space may become one narrow and long rectangular space, per the DOP of equations. After selecting the core satellite list and defining the search space, a first search engine is initiated to eliminate wrong candidate solutions of the potential candidates of ambiguity resolution generated for the core satellites.

The method 100 shown in FIG. 1 also includes determining whether a new core satellite list provides a better PDOP than the core satellite list(s) of other search engine(s) (block 112). If there is a new core satellite list that provides a better PDOP than the core satellite list(s) of other search engine(s), then a new search engine is initiated using an updated candidate list compared to the previous search engine(s) utilizing core satellite list(s) with a worse PDOP (block 114). This process will be discussed further with respect to FIG. 4.

The method 100 proceeds with setting residual thresholds based on measurement errors (block 116). For each residual, a threshold is set to do the validation check. In some examples, the residual thresholds are set automatically. Since the quality of carrier phase measurements can be influenced by a number of factors (different receiver types, antenna types, receiver working environment, etc.), and the residuals are calculated from carrier phases, the residuals will vary based on the measurement quality. Double differencing is a commonly used method in ambiguity resolution, which could eliminate most of errors in carrier phases like tropospheric delay, ionospheric delay, satellite clock error and receiver clock error. However, in the long baseline situation, errors like the tropospheric delay and ionospheric delay may not be sufficiently eliminated, which leads to relatively large residuals. Thus, in the examples of the present application, the residual thresholds are not fixed, and the residual thresholds are adjusted to adapt to different situations. In some examples, a set of stricter thresholds are utilized for high quality receivers, which might not work for a low-cost receiver. For example, the strict thresholds might lead to low ambiguity fix rate for the low-cost receiver. However, if the thresholds are too relaxed, there can be some false ambiguity fixes. Therefore, automatic threshold setting provides more flexibility and helps to improve the ambiguity fix rate and positioning accuracy.

Figure 3:
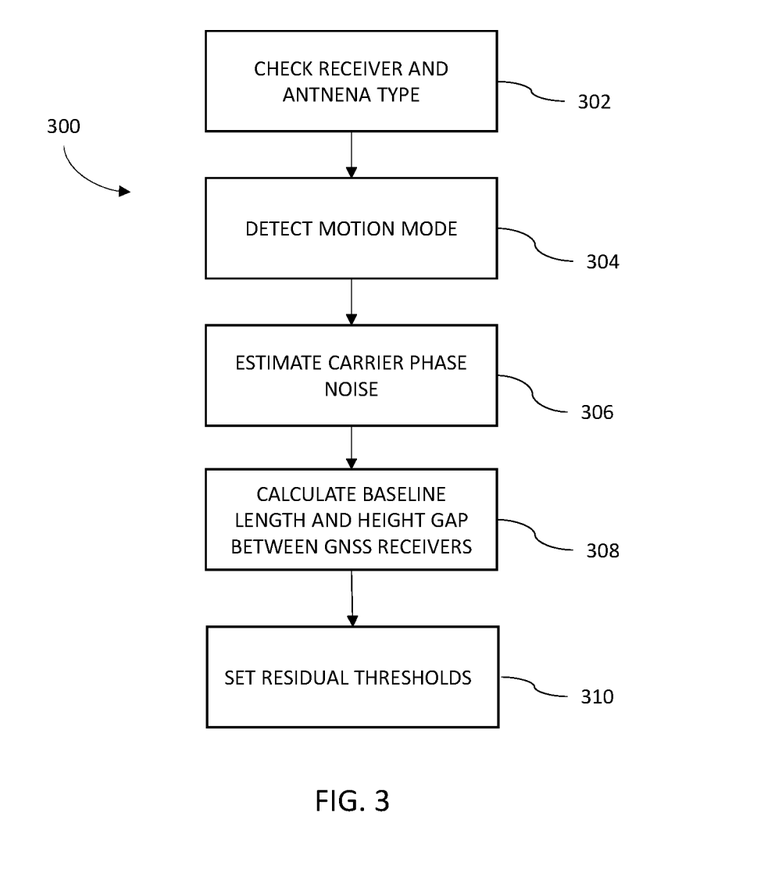
FIG. 3 is a flow diagram of an example method of automatic adaptive residual threshold setting.

FIG. 3 illustrates one example method 300 of automatically setting the residual thresholds.

The method 300 shown in FIG. 3 includes checking a receiver type and an antenna type (block 302), detecting a motion mode (static/dynamic) (block 304), and/or estimating carrier phase noise (block 306). In some examples, the method 300 includes determining the baseline length and a height gap between the GNSS receivers (for example, on the base station and the rover station) (block 308). In some examples, other factors like multi-path intensity, the intensity of local ionosphere delay, or the like are also considered. The residual thresholds are set based on the information determined/gathered according to the other steps of the method (block 310). In some examples, at least one residual threshold is set by combining (for example, adding) the estimated error elements described above into a single value.

For some residuals, multiple thresholds can be used. For example, an instantaneous threshold can be set to a larger value such that a candidate is eliminated immediately if the residual value exceeds the instantaneous threshold, and a strike threshold can be set to a smaller value such that a candidate is eliminated after multiple epochs (for example, more than two) of the residual value exceeding the strike threshold. In some examples, a counter is utilized for a particular candidate to keep track of the number of consecutive times the residual value has exceed the strike threshold and the counter is compared to a threshold indicative of a maximum number of consecutive times allowed prior to elimination of the candidate.

The residual thresholds are adaptively adjusted during operation. For example, the residual thresholds can be adjusted every epoch by taking into account the current the quality of GNSS measurements using the techniques described above.

Figure 4:
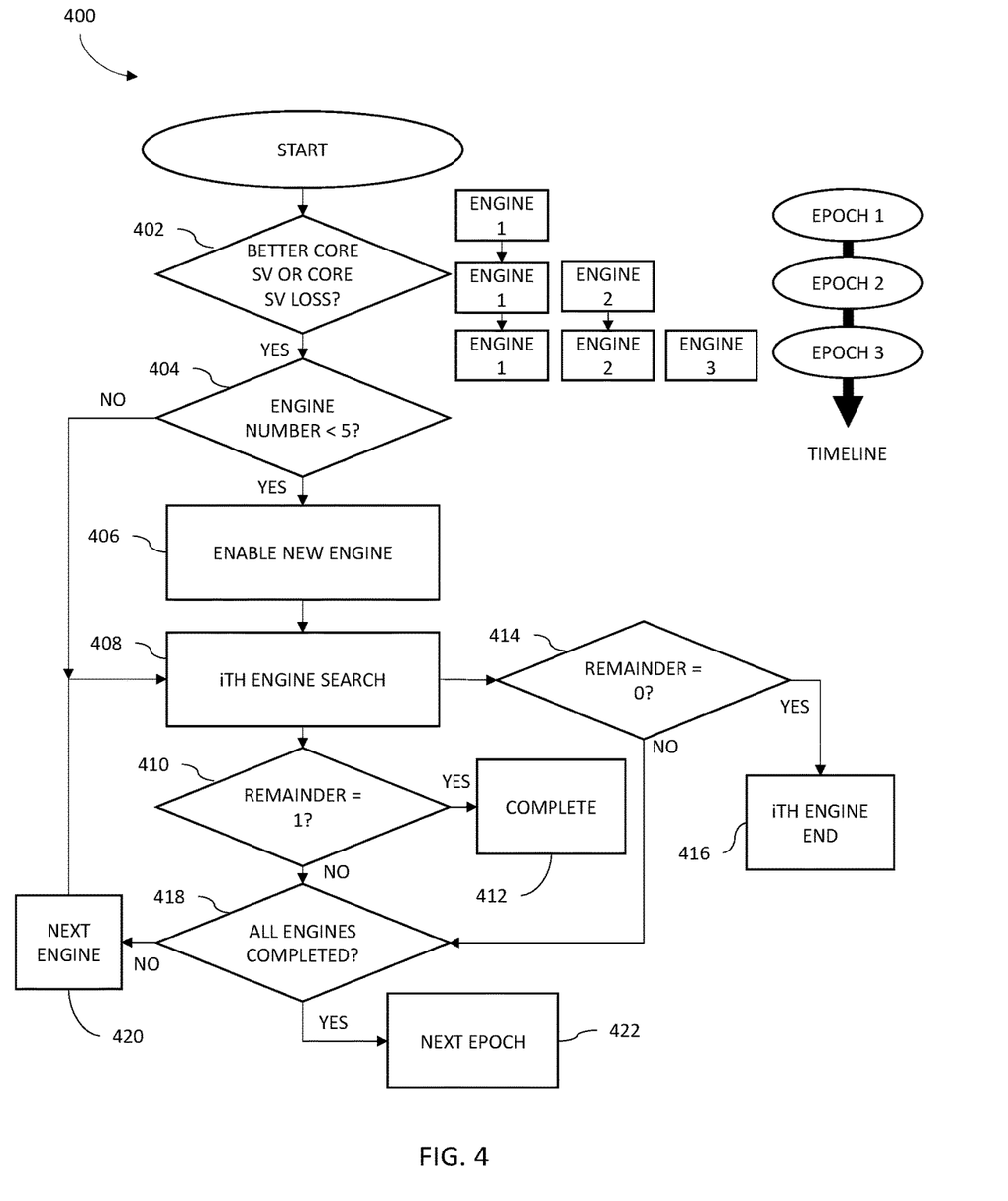
FIG. 4 is a flow diagram of an example method for multi-engine ambiguity resolution.

After the residual thresholds are adaptively set, the method 100 shown in FIG. 1 proceeds with a multi-engine ambiguity resolution search utilizing the residual thresholds (block 118). FIG. 4 shows an example multi-engine ambiguity resolution method 400. Some of the steps shown in FIG. 4 are repeated in FIG. 1.

The multi-engine method 400 begins with determining whether there is a better list (group) of core satellites than the existing list(s) of core satellites determined in the previous epochs or whether one of the core satellites is lost (for example, no longer visible) (block 402). In some examples, a list of core satellites is "better" if it produces a better PDOP. If there is not a better list of core satellites or one of the core satellites is lost, then an additional engine is not enabled, and the previous number of engines is used during the current epoch.

If there is a better list of core satellites or one of the core satellites is lost, then the method 400 proceeds with determining whether the number of active engines is less than a threshold (block 404) (shown as 5 in FIG. 4, but could be different). The threshold for the number of engines is indicative of the desired performance and the processing resources available. For example, if higher performance is desired and/or there is a greater amount of resources available, then the threshold can be set to a larger value so a greater number of engines can be enabled for a single epoch. If the number of active engines is less than the threshold, then a new engine is enabled (block 406).

The method 400 proceeds with conducting the engine searches for each active engine (block 408). In some examples, the engine searches are executed in parallel for each epoch. In some examples, the engine searches include conducting the validity test for the integer candidates until a single candidate remains for one of the active engines. An example validity test is discussed in more detail with respect to FIG. 5 below.

If the number of remaining candidates for an engine is greater than 1 after the search process (block 410) and all engine searches are completed for that particular epoch (block 418), the method proceeds to the next epoch (block 422).

If the number of remaining candidates for an engine is zero (block 414), then that particular engine is ended/reset, and the resources can be redistributed for use in the next epoch (block 416).

In ambiguity resolution, a correct integer candidate (the resolved integers) is found in integer candidate arrays. A set of thresholds are used to validate if any of the integer candidate arrays is an acceptable integer array.

Figure 5:
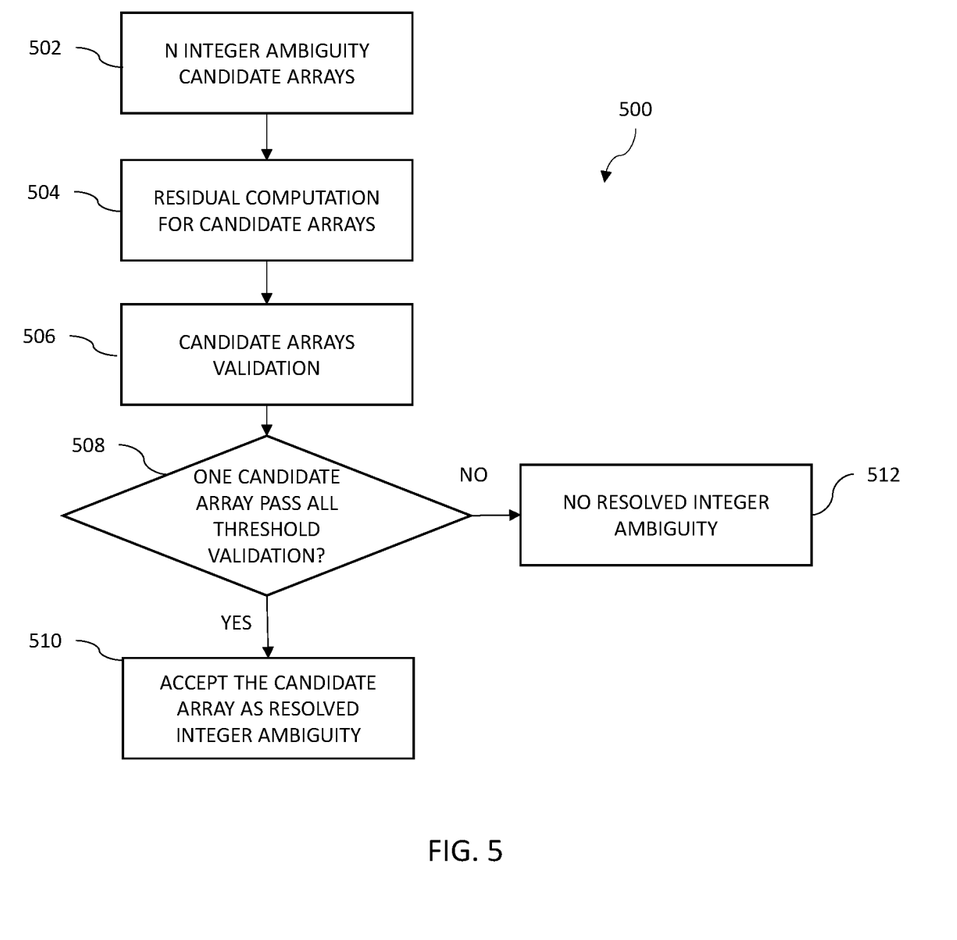
FIG. 5 is a flow diagram of an example method for integer ambiguity candidate validation.

FIG. 5 illustrates an example method 500 of the validation process, which is performed by each search engine discussed above with respect to FIG. 4.

The method 500 includes determining the integer ambiguity candidate arrays (block 502), computing the residuals for each of the candidate arrays (block 504), and validating the candidate arrays (block 506).

In ambiguity resolution searching, orthogonal test statistic methods are used to set instantaneous/strike threshold(s) to eliminate wrong candidates. For example, the following can be used in blocks 502-506:
1) Compute increment of equation of measurement, the increment is caused by non-zero integer ambiguity in specific candidate.
2) Compute carrier phase residual in the equation of measurement for each redundant satellite, per the computed increment in (1).
3) Compute the diagonalizing transformation and Eigenvector from the equations of core satellites' measurements.
4) Orthogonalize redundant residuals, square, and divide by Eigenvector element.

Based on normalized residuals, the test statistic threshold is used for strike count and the instantaneous test statistic threshold is used to eliminate wrong candidates until only 1 candidate remains.

The method 500 further includes determining whether only a single candidate array passed all of the threshold validations (block 508). If so, the single candidate array is accepted as the resolved integer ambiguity (block 510). If not, it is determined that the integer ambiguity is not resolved for that epoch (block 512).

When a single candidate remains for an engine, the method 100 shown in FIG. 1 proceeds with entering the candidate values into the three equations derived from the double differencing operations to determine relative position (dX, dY, dZ) and ambiguity resolution using the redundant list of satellites (block 122). When a single candidate remains for an engine, the method 100 proceeds with ending all other engines are ended/reset and the resources are redistributed for future epochs (block 124).

The methods described herein were compared to a leading Commercial GNSS Post-Processing Software (CGPPS) as reference with the same data source to check the performance of the new methods. The results indicate that even in an urban canyon scenario (poor satellite visibility, frequent cycle slip of carrier phase, tracking loss and recapture of satellite signal, complex multi-path impact, etc.), the methods described herein can achieve competitive or even better fixing rate and positioning accuracy.

Figure 6:
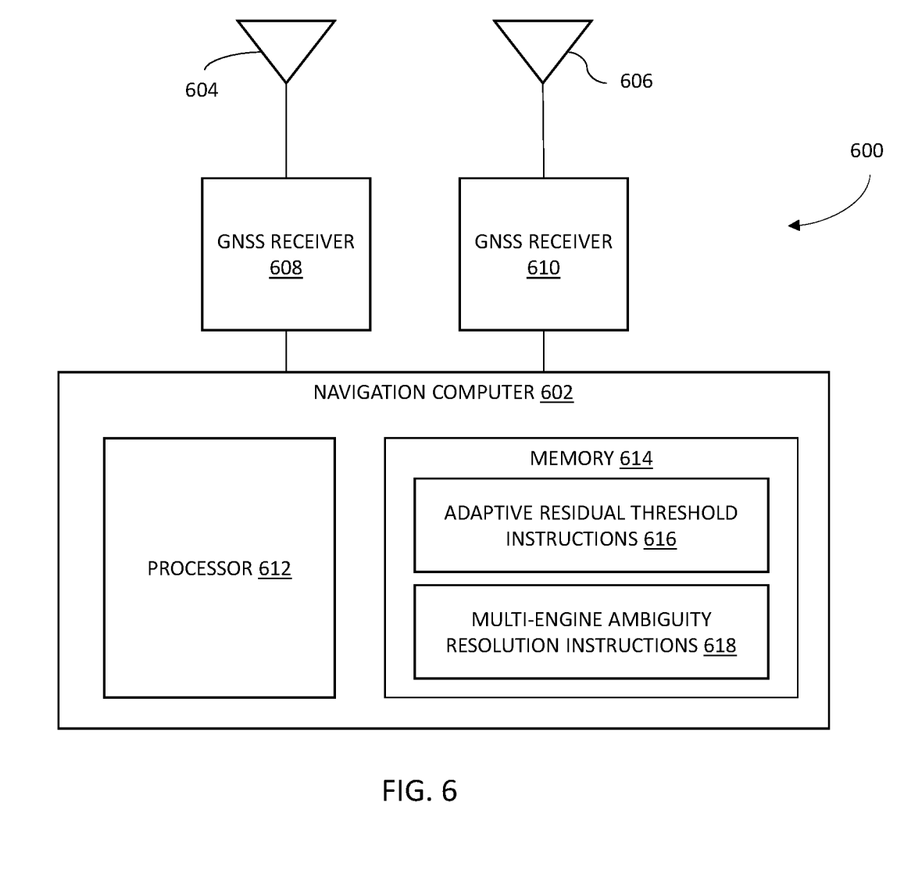
FIG. 6 is an example navigation system to implement ambiguity resolution techniques.

FIG. 6 illustrates a block diagram of an example navigation system 600 that can be used to implement the methods described above with respect to FIGS. 1-5. In the example shown in FIG. 6, the navigation system 600 includes a navigation computer 602, GNSS antennas 604, 606, and GNSS receivers 608, 610.

In some examples, the navigation system 600 is mounted to or incorporated into a vehicle (for example, an aircraft, sea craft, spacecraft, automobile, or other types of vehicles). In other examples, the navigation system 600 is located on or part of a movable object (for example, a phone, personal electronics, land surveying equipment, or other objects capable of being move from one location to another). The navigation system 600 is configured to acquire navigation information from multiple sources. To handle the acquired navigation information, the navigation system 600 can include a navigation computer 602, which can include at least one processor 612 and at least one memory 614.

In the example shown in FIG. 6, the navigation system 600 includes a first GNSS antenna 604 that is communicatively coupled to a first GNSS receiver 608 and configured to provide received GNSS signals to the first GNSS receiver 608. In the example shown in FIG. 6, the navigation system 600 also includes a second GNSS antenna 606 that is communicatively coupled to a second GNSS receiver 610 and configured to provide received GNSS signals to the second GNSS receiver 610. The first GNSS antenna 604 and the second GNSS antenna 606 are separated by a particular distance, which is referred to as a baseline. In some examples, the first GNSS antenna 604 and the second GNSS antenna 606 are coupled together via a rigid body to reduce flexibility of the baseline during operation.

In some examples, the navigation system 600 receives satellite signals from multiple GNSS satellites that are observable to the first GNSS antenna 604 and the second GNSS antenna 606. For example, during operation, the GNSS receivers 608, 610 receive GNSS satellite signals from the presently observable GNSS satellites. As used herein, the GNSS satellites may be any combination of satellites that provide navigation signals. For example, the GNSS satellites may be part of the global positioning system (GPS), Globalnaya Navigatsionnaya Sputnikovaya Sistema (GLONASS), Galileo system, COMPASS (BeiDou), or another system of satellites that form part of a GNSS. The GNSS satellites may provide information that can be used for navigational purposes. The navigation computer 602 and GNSS receivers 608, 610 may receive the satellite signals and extract position, velocity, and time data from the signals to acquire pseudo range and/or raw carrier phase measurements.

In various aspects, system elements, method steps, or examples described throughout this disclosure may be implemented on one or more computer systems, field programmable gate array (FPGA), application specific integrated circuit (ASIC) or similar devices comprising hardware executing code to realize those elements, processes, or examples, said code stored on a non-transient data storage device. These devices include or function with software programs, firmware, or other computer readable instructions for carrying out various methods, process tasks, calculations, and control functions used in the methods and systems described herein.

The methods (such as methods 100, 200, 300, 400, 500) described above may be implemented by computer executable instructions (for example, adaptive residual threshold instructions 616 and multi-engine ambiguity resolution instructions 618), which are executed by at least one processor, such as the processor 612. These instructions are typically stored on any appropriate computer readable medium (such as memory 614) used for storage of computer readable instructions or data structures. The computer readable medium can be implemented as any available media that can be accessed by a general purpose or special purpose computer or processor, or any programmable logic device. Suitable processor-readable media may include storage or memory media such as magnetic or optical media. For example, storage or memory media may include conventional hard disks, Compact Disk-Read Only Memory (CD-ROM), volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), etc.), Read Only Memory (ROM), Electrically Erasable Programmable ROM (EEPROM), and flash memory, etc. Suitable processor-readable media may also include transmission media, which are provided by communication networks, wired, and/or wireless.

The methods and techniques described here may be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs).

EXAMPLE EMBODIMENTS

Example 1 includes a system, comprising: a first Global Navigation Satellite System (GNSS) receiver coupled to a first antenna; a second GNSS receiver coupled to a second antenna; at least one processor coupled to a memory, the first GNSS receiver, and the second GNSS receiver, wherein the at least one processor is configured to: load GNSS data from the first GNSS receiver and the second GNSS receiver; determine a standalone position of the first GNSS receiver and the second GNSS receiver; double difference error estimation on code-based pseudorange; double difference pseudorange position and determine covariance using code-based pseudorange; select core satellites and define a search space for ambiguity resolution by a first searching engine in its first epoch; determine a first list of candidates for ambiguity resolution using the core satellites; adaptively set residual thresholds based on measurement errors; eliminate candidates from the first list of candidates in response to a respective residual exceeding the adaptively set residual thresholds until a single candidate remains in the first list of candidates; and determine position information using the single candidate remaining in the first list of candidates.

Example 2 includes the system of Example 1, wherein the at least one processor is further configured to: determine whether a second group of satellites different than the core satellites have a better position-dilution-of-precision than the core satellites in one new epoch; in response to determining that the second group of satellites different than the core satellites have a better position-dilution-of-precision than the core satellites, the at least one processor is further configured to: enable a second searching engine using the second group of satellites, wherein the second searching engine is configured to operate in parallel with the first searching engine; determine a second list of candidates for ambiguity resolution using the second group of satellites; eliminate candidates from the second list of candidates in response to a respective residual exceeding the adaptively set residual thresholds until a single candidate remains in the second list of candidates; determine position information using the single candidate remaining from the second list of candidates.

Example 3 includes the system of Example 2, wherein the at least one processor is further configured to: determine whether a third group of satellites different than the core satellites and the second group of satellites have a better position-dilution-of-precision than the core satellites and the second group of satellites in one new epoch; in response to determining that the third group of satellites different than the core satellites and the second group of satellites have a better position-dilution-of-precision than the core satellites and the second group of satellites, the at least one processor is further configured to: enable a third searching engine using the third group of satellites, wherein the third searching engine is configured to operate in parallel with the first searching engine and the second searching engine; determine a third list of candidates for ambiguity resolution using the different group of satellites; eliminate candidates from the third list of candidates in response to a respective residual exceeding the adaptively set residual thresholds until a single candidate remains in the third list of candidates; determine position information using the single candidate remaining from the third list of candidates.

Example 4 includes the system of any of Examples 1-3, wherein the at least one processor is configured to adaptively set the residual thresholds based on receiver type, antenna type, a motion mode, estimated carrier phase noise, a baseline length between the first GNSS receiver and the second GNSS receiver, a height gap between the first GNSS receiver and the second GNSS receiver, multi-path intensity, and/or intensity of local ionosphere delay.

Example 5 includes the system of any of Examples 1-4, wherein a number of the core satellites is equal to a number of constellations used by the system plus three.

Example 6 includes the system of any of Examples 1-5, wherein the at least one processor is configured to adaptively set multiple thresholds for at least one residual, wherein the multiple thresholds include: an instantaneous threshold corresponding to a larger value such that a candidate is eliminated immediately if the at least one residual exceeds the instantaneous threshold; and a strike threshold corresponding to a smaller value such that a candidate is eliminated after multiple epochs where the at least one residual exceeds the strike threshold.

Example 7 includes the system of Example 6, wherein the at least one processor is configured to: implement a counter to record a number of consecutive epochs where the at least one residual exceeds the strike threshold; and compare the number of consecutive epochs where the at least one residual exceeds the strike threshold to a threshold indicative of a maximum number of epochs allowed prior to elimination.

Example 8 includes the system of any of Examples 1-7, wherein the system is configured for multi-constellation operation and the at least one processor is configured to select more than four core satellites.

Example 9 includes the system of any of Examples 1-8, wherein the at least one processor is configured to select the core satellites based on which satellites provide a best position-dilution-of-precision in the first epoch.

Example 10 includes a method for Global Navigation Satellite System (GNSS) ambiguity resolution, the method comprising: receiving GNSS data from a plurality of GNSS receivers, wherein each of the GNSS receivers is coupled to a respective antenna; determining a standalone position of the plurality of GNSS receivers; double differencing error estimation on code-based pseudorange; double differencing pseudorange position and determine covariance using code-based pseudorange; selecting core satellites and defining a search space for ambiguity resolution by a first searching engine in its first epoch; determining a first list of candidates for ambiguity resolution using the core satellites; adaptively setting residual thresholds based on measurement errors; eliminating candidates from the first list of candidates in response to a respective residual exceeding the adaptively set residual thresholds until a single candidate remains in the first list of candidates; determining position information using the single candidate remaining in the first list of candidates.

Example 11 includes the method of Example 10, further comprising: determining whether a second group of satellites different than the core satellites have a better position-dilution-of-precision than the core satellites in one new epoch; in response to determining that the second group of satellites different than the core satellites have a better position-dilution-of-precision than the core satellites, the method further comprises: enabling a second searching engine using the second group of satellites, wherein the second searching engine is configured to operate in parallel with the first searching engine; determining a second list of candidates for ambiguity resolution using the second group of satellites; eliminating candidates from the second list of candidates in response to a respective residual exceeding the adaptively set residual thresholds until a single candidate remains in the second list of candidates; determining position information using the single candidate remaining from the second list of candidates.

Example 12 includes the method of Example 11, further comprising: determining whether a third group of satellites different than the core satellites and the second group of satellites have a better position-dilution-of-precision than the core satellites and the second group of satellites in one new epoch; in response to determining that the third group of satellites different than the core satellites and the second group of satellites have a better position-dilution-of-precision than the core satellites and the second group of satellites, the method further comprises: enabling a third searching engine using the third group of satellites, wherein the third searching engine is configured to operate in parallel with the first searching engine and the second searching engine; determining a third list of candidates for ambiguity resolution using the different group of satellites; eliminating candidates from the third list of candidates in response to a respective residual exceeding the adaptively set residual thresholds until a single candidate remains in the third list of candidates; determining position information using the single candidate remaining from the third list of candidates.

Example 13 includes the method of any of Examples 10-12, wherein the residual thresholds are adaptively set based on receiver type, antenna type, a motion mode (static/dynamic), estimated carrier phase noise, baseline length and height gap between the plurality of GNSS receivers, multi-path intensity, and/or intensity of local ionosphere delay.

Example 14 includes the method of any of Examples 10-13, wherein selecting core satellites includes selecting a number of core satellites equal to a number of constellations used for the method plus three.

Example 15 includes the method of any of Examples 10-14, wherein adaptively setting residual thresholds based on measurement errors includes adaptively setting multiple thresholds for at least one residual, wherein the multiple thresholds include: an instantaneous threshold corresponding to a larger value such that a candidate is eliminated immediately if the at least one residual exceeds the instantaneous threshold; and a strike threshold corresponding to a smaller value such that a candidate is eliminated after multiple epochs where the at least one residual exceeds the strike threshold.

Example 16 includes the method of any of Examples 10-15, wherein selecting core satellites includes selecting more than four core satellites from multiple constellations.

Example 17 includes the method of any of Examples 10-16, wherein selecting core satellites is based on which satellites provide a best position-dilution-of-precision in the first epoch.

Example 18 includes a non-transitory computer readable medium having computer-executable instructions stored thereon which, when executed by one or more processing devices, cause the one or more processing devices to: receive GNSS data from a first GNSS receiver communicatively coupled to a first GNSS antenna and a second GNSS receiver communicatively coupled to a second GNSS antenna; determine a standalone position of the first GNSS receiver and the second GNSS receiver; double difference error estimation on code-based pseudorange; double difference pseudorange position and determine covariance using code-based pseudorange; select core satellites and define a search space for ambiguity resolution by a first searching engine in its first epoch; determine a first list of three-dimensional (3D) position candidates for ambiguity resolution using the core satellites; adaptively set residual thresholds based on measurement errors; eliminate 3D position candidates from the first list of 3D position candidates in response to a respective residual exceeding the adaptively set residual thresholds until a single 3D position candidate remains in the first list of 3D position candidates; and determine 3D position information using the single 3D position candidate remaining in the first list of candidates.

Example 19 includes the non-transitory computer readable medium of Example 18, wherein the computer-executable instructions, when executed by the one or more processing devices, cause the one or more processing devices to adaptively set the residual thresholds based on receiver type, antenna type, a motion mode, estimated carrier phase noise, a baseline length between the first GNSS receiver and the second GNSS receiver, a height gap between the first GNSS receiver and the second GNSS receiver, multi-path intensity, and/or intensity of local ionosphere delay.

Example 20 includes the non-transitory computer readable medium of any of Examples 18-19, wherein the computer-executable instructions, when executed by the one or more processing devices, cause the one or more processing devices to: determine whether a second group of satellites different than the core satellites have a better position-dilution-of-precision than the core satellites in one new epoch; in response to determining that the second group of satellites different than the core satellites have a better position-dilution-of-precision than the core satellites, enable a second searching engine using the second group of satellites, wherein the second searching engine is configured to operate in parallel with the first searching engine; determine a second list of 3D position candidates for ambiguity resolution using the second group of satellites; eliminate 3D position candidates from the second list of 3D position candidates in response to a respective residual exceeding the adaptively set residual thresholds until a single 3D position candidate remains in the second list of 3D position candidates; determine 3D position information using the single 3D position candidate remaining from the second list of 3D position candidates.

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

What is claimed is:

1. A system, comprising:
  a first Global Navigation Satellite System (GNSS) receiver coupled to a first antenna;
  a second GNSS receiver coupled to a second antenna;
  at least one processor coupled to a memory, the first GNSS receiver, and the second GNSS receiver, wherein the at least one processor is configured to:
    load GNSS data from the first GNSS receiver and the second GNSS receiver;
    determine a standalone position of the first GNSS receiver and the second GNSS receiver using pseudorange observations;
    perform error estimation using a double differenced code-based pseudorange;
    determine a covariance using the double differenced code-based pseudorange;
    select core satellites that provide a best position-dilution-of-precision out of all visible GNSS satellites and define a search space for ambiguity resolution by a first searching engine in its first epoch, wherein the search space for ambiguity resolution is larger than a code solution uncertainty;
    determine a first list of candidates for ambiguity resolution using the core satellites;

adaptively set residual thresholds based on measurement errors;
eliminate candidates from the first list of candidates in response to a respective residual exceeding the adaptively set residual thresholds until a single candidate remains in the first list of candidates; and
determine position information using the single candidate remaining in the first list of candidates by applying ambiguities associated with the single candidate remaining in the first list of candidates;
wherein the at least one processor is further configured to:
determine whether a second group of satellites different than the core satellites have a better position-dilution-of-precision than the core satellites in a first new epoch subsequent to the first epoch;
in response to determining that the second group of satellites different than the core satellites have a better position-dilution-of-precision than the core satellites, the at least one processor is further configured to:
enable a second searching engine using the second group of satellites, wherein the second searching engine is configured to operate in parallel with the first searching engine;
determine a second list of candidates for ambiguity resolution using the second group of satellites;
eliminate candidates from the second list of candidates in response to a respective residual exceeding the adaptively set residual thresholds until a single candidate remains in the second list of candidates;
determine position information using the single candidate remaining from the second list of candidates by applying ambiguities associated with the single candidate remaining in the second list of candidates.

2. The system of claim 1, wherein the at least one processor is further configured to:
determine whether a third group of satellites different than the core satellites and the second group of satellites have a better position-dilution-of-precision than the core satellites and the second group of satellites in a second new epoch subsequent to the first epoch and the first new epoch;
in response to determining that the third group of satellites different than the core satellites and the second group of satellites have a better position-dilution-of-precision than the core satellites and the second group of satellites, the at least one processor is further configured to:
enable a third searching engine using the third group of satellites, wherein the third searching engine is configured to operate in parallel with the first searching engine and the second searching engine;
determine a third list of candidates for ambiguity resolution using the different group of satellites;
eliminate candidates from the third list of candidates in response to a respective residual exceeding the adaptively set residual thresholds until a single candidate remains in the third list of candidates;
determine position information using the single candidate remaining from the third list of candidates by applying ambiguities associated with the single candidate remaining from the third list of candidates.

3. The system of claim 1, wherein the at least one processor is configured to adaptively set the residual thresholds based on receiver type, antenna type, a motion mode, estimated carrier phase noise, a baseline length between the first GNSS receiver and the second GNSS receiver, a height gap between the first GNSS receiver and the second GNSS receiver, multi-path intensity, and/or intensity of local ionosphere delay.

4. The system of claim 1, wherein a number of the core satellites is equal to a number of constellations used by the system plus three.

5. The system of claim 1, wherein the at least one processor is configured to adaptively set multiple thresholds for at least one residual, wherein the multiple thresholds include:
an instantaneous threshold corresponding to a larger value such that a candidate is eliminated immediately if the at least one residual exceeds the instantaneous threshold; and
a strike threshold corresponding to a smaller value such that a candidate is eliminated after multiple epochs where the at least one residual exceeds the strike threshold.

6. The system of claim 5, wherein the at least one processor is configured to:
implement a counter to record a number of consecutive epochs where the at least one residual exceeds the strike threshold; and
compare the number of consecutive epochs where the at least one residual exceeds the strike threshold to a threshold indicative of a maximum number of epochs allowed prior to elimination.

7. The system of claim 1, wherein the system is configured for multi-constellation operation and the at least one processor is configured to select more than four core satellites.

8. A method for Global Navigation Satellite System (GNSS) ambiguity resolution, the method comprising:
receiving GNSS data from a plurality of GNSS receivers, wherein each of the GNSS receivers is coupled to a respective antenna;
determining a standalone position of the plurality of GNSS receivers using pseudorange observations;
performing error estimation using a double differenced code-based pseudorange;
determining a covariance using the double differenced code-based pseudorange;
selecting core satellites and defining a search space for ambiguity resolution by a first searching engine in its first epoch, wherein selecting core satellites is based on which satellites provide a best position-dilution-of-precision in the first epoch, wherein the search space for ambiguity resolution is larger than a code solution uncertainty;
determining a first list of candidates for ambiguity resolution using the core satellites;
adaptively setting residual thresholds based on measurement errors;
eliminating candidates from the first list of candidates in response to a respective residual exceeding the adaptively set residual thresholds until a single candidate remains in the first list of candidates;
determining position information using the single candidate remaining in the first list of candidates by applying ambiguities associated with the single candidate remaining in the first list of candidates;
determining whether a second group of satellites different than the core satellites have a better position-dilution-of-precision than the core satellites in a first new epoch subsequent to the first epoch;

in response to determining that the second group of satellites different than the core satellites have a better position-dilution-of-precision than the core satellites, the method further comprises:
  enabling a second searching engine using the second group of satellites, wherein the second searching engine is configured to operate in parallel with the first searching engine;
  determining a second list of candidates for ambiguity resolution using the second group of satellites;
  eliminating candidates from the second list of candidates in response to a respective residual exceeding the adaptively set residual thresholds until a single candidate remains in the second list of candidates;
  determining position information using the single candidate remaining from the second list of candidates by applying ambiguities associated with the single candidate remaining in the second list of candidates.

9. The method of claim 8, further comprising:
determining whether a third group of satellites different than the core satellites and the second group of satellites have a better position-dilution-of-precision than the core satellites and the second group of satellites in a second new epoch subsequent to the first epoch and the first new epoch;
in response to determining that the third group of satellites different than the core satellites and the second group of satellites have a better position-dilution-of-precision than the core satellites and the second group of satellites, the method further comprises:
  enabling a third searching engine using the third group of satellites, wherein the third searching engine is configured to operate in parallel with the first searching engine and the second searching engine;
  determining a third list of candidates for ambiguity resolution using the different group of satellites;
  eliminating candidates from the third list of candidates in response to a respective residual exceeding the adaptively set residual thresholds until a single candidate remains in the third list of candidates;
  determining position information using the single candidate remaining from the third list of candidates by applying ambiguities associated with the single candidate remaining from the third list of candidates.

10. The method of claim 8, wherein the residual thresholds are adaptively set based on receiver type, antenna type, a motion mode (static/dynamic), estimated carrier phase noise, baseline length and height gap between the plurality of GNSS receivers, multi-path intensity, and/or intensity of local ionosphere delay.

11. The method of claim 8, wherein selecting core satellites includes selecting a number of core satellites equal to a number of constellations used for the method plus three.

12. The method of claim 8, wherein adaptively setting residual thresholds based on measurement errors includes adaptively setting multiple thresholds for at least one residual, wherein the multiple thresholds include:
  an instantaneous threshold corresponding to a larger value such that a candidate is eliminated immediately if the at least one residual exceeds the instantaneous threshold; and
  a strike threshold corresponding to a smaller value such that a candidate is eliminated after multiple epochs where the at least one residual exceeds the strike threshold.

13. The method of claim 8, wherein selecting core satellites includes selecting more than four core satellites from multiple constellations.

14. A non-transitory computer readable medium having computer-executable instructions stored thereon which, when executed by one or more processing devices, cause the one or more processing devices to:
  receive GNSS data from a first GNSS receiver communicatively coupled to a first GNSS antenna and a second GNSS receiver communicatively coupled to a second GNSS antenna;
  determine a standalone position of the first GNSS receiver and the second GNSS receiver using pseudorange observations;
  perform error estimation using a double differenced code-based pseudorange;
  determine a covariance using the double differenced code-based pseudorange;
  select core satellites that provide a best position-dilution-of-precision out of all visible GNSS satellites and define a search space for ambiguity resolution by a first searching engine in its first epoch, wherein the search space for ambiguity resolution is larger than a code solution uncertainty;
  determine a first list of three-dimensional (3D) position candidates for ambiguity resolution using the core satellites;
  adaptively set residual thresholds based on measurement errors;
  eliminate 3D position candidates from the first list of 3D position candidates in response to a respective residual exceeding the adaptively set residual thresholds until a single 3D position candidate remains in the first list of 3D position candidates; and
  determine 3D position information using the single 3D position candidate remaining in the first list of candidates by applying ambiguities associated with the single 3D position candidates remaining in the first list of candidates;
  wherein the computer-executable instructions, when executed by the one or more processing devices, cause the one or more processing devices to:
    determine whether a second group of satellites different than the core satellites have a better position-dilution-of-precision than the core satellites in a new epoch subsequent to the first epoch;
    in response to determining that the second group of satellites different than the core satellites have a better position-dilution-of-precision than the core satellites,
      enable a second searching engine using the second group of satellites, wherein the second searching engine is configured to operate in parallel with the first searching engine;
      determine a second list of 3D position candidates for ambiguity resolution using the second group of satellites;
      eliminate 3D position candidates from the second list of 3D position candidates in response to a respective residual exceeding the adaptively set residual thresholds until a single 3D position candidate remains in the second list of 3D position candidates;
      determine 3D position information using the single 3D position candidate remaining from the second list of 3D position candidates by applying the ambiguities associated with the single 3D position candidate remaining in the second list of candidates.

15. The non-transitory computer readable medium of claim 14, wherein the computer-executable instructions, when executed by the one or more processing devices, cause the one or more processing devices to adaptively set the residual thresholds based on receiver type, antenna type, a motion mode, estimated carrier phase noise, a baseline length between the first GNSS receiver and the second GNSS receiver, a height gap between the first GNSS receiver and the second GNSS receiver, multi-path intensity, and/or intensity of local ionosphere delay.

* * * * *